United States Patent [19]

Thompson

[11] Patent Number: 4,866,876
[45] Date of Patent: Sep. 19, 1989

[54] CUSHION DEVICE FOR ANIMAL TRAPS

[76] Inventor: Robert R. Thompson, 805 Cerro Gordo, Ackley, Iowa 50601

[21] Appl. No.: 330,746

[22] Filed: Mar. 30, 1989

[51] Int. Cl.$^4$ .............................................. A01M 23/26
[52] U.S. Cl. .......................................... 43/90; 43/96
[58] Field of Search .................... 43/58, 88, 90, 96, 97

[56] References Cited

U.S. PATENT DOCUMENTS

| | | | |
|---|---|---|---|
| 4,175,351 | 11/1979 | Souza | 43/90 |
| 4,184,282 | 1/1980 | Lifshutz | 43/90 |
| 4,266,364 | 5/1981 | McBride | 43/90 |
| 4,557,068 | 12/1985 | Thomas et al. | 43/90 |

Primary Examiner—Nicholas P. Godici
Assistant Examiner—Michael William Starkweather
Attorney, Agent, or Firm—G. Brian Pingel

[57] ABSTRACT

A device attachable to at least one of the co-acting jaws of a steel jawed trap for capturing an animal. The device has at least one cushion assembly that includes an elongated carrier frame attachable to at least one jaw of the trap, and spaced apart cushion members secured to the carrier frame. The cushion members project outwardly from the carrier frame and are in a parallel alignment to one another to engage a limb of the animal and cushion and distribute the force of the jaws of the trap to reduce animal injuries.

7 Claims, 1 Drawing Sheet

U.S. Patent
Sep. 19, 1989
4,866,876
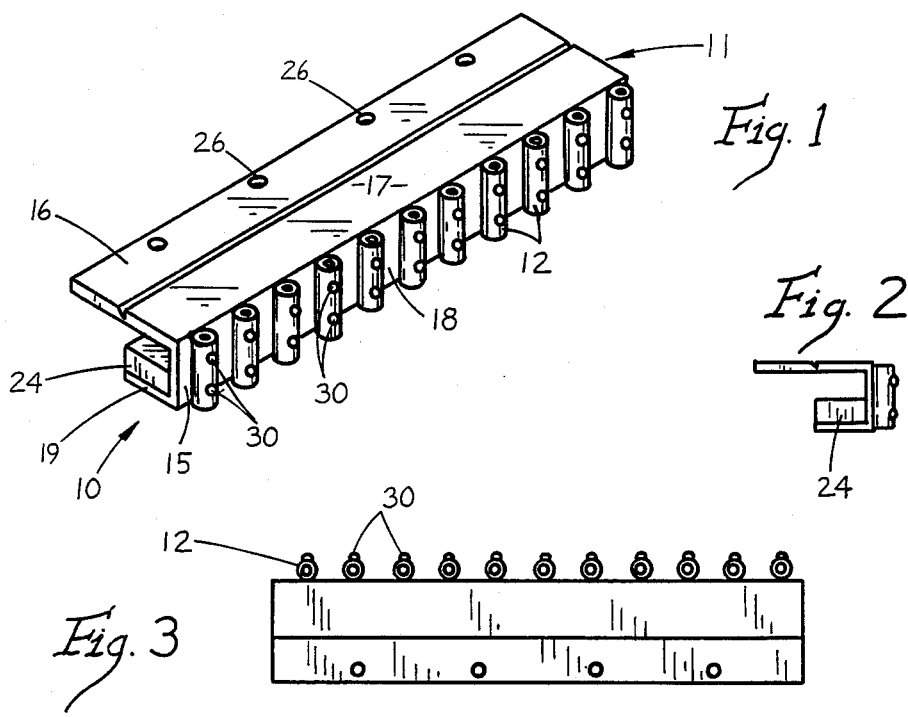
Fig. 1
Fig. 2
Fig. 3
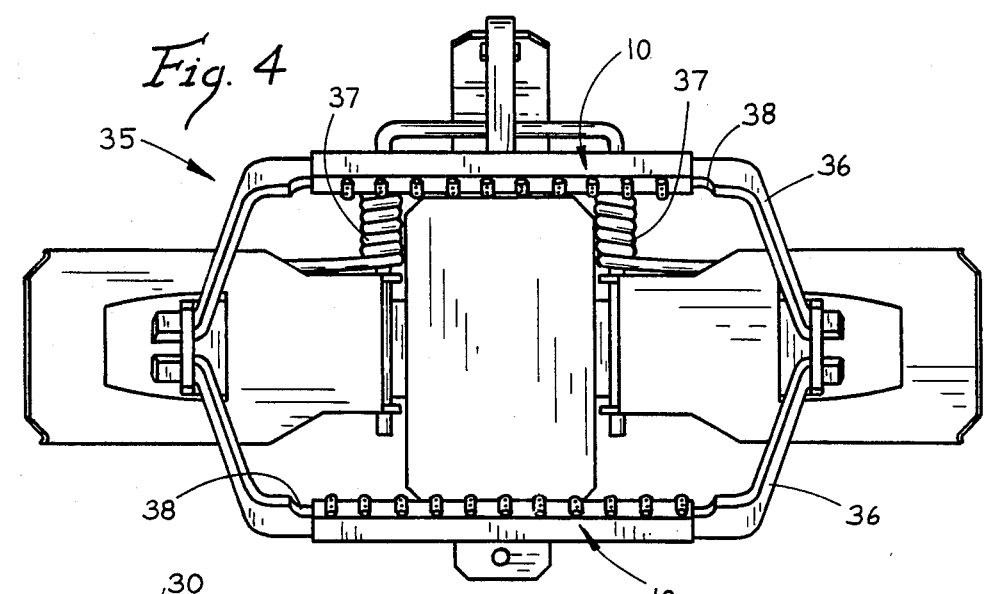
Fig. 4
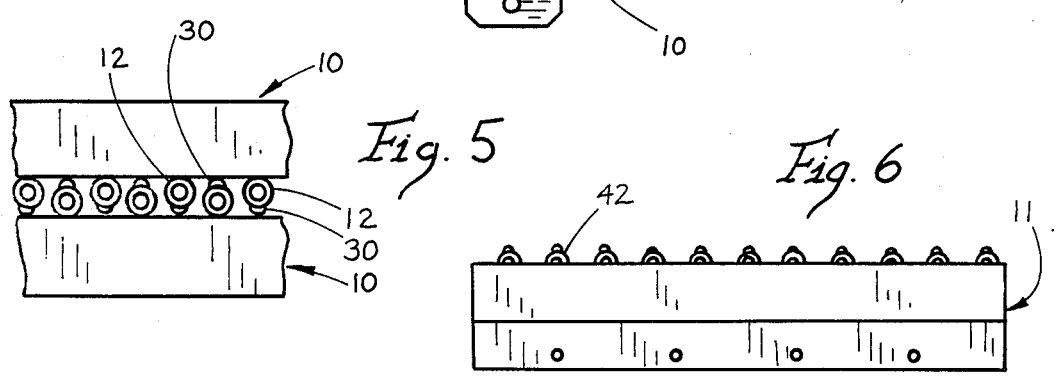
Fig. 5
Fig. 6

CUSHION DEVICE FOR ANIMAL TRAPS

BACKGROUND OF THE INVENTION

1. Field of the Invention

The present invention relates in general to steel jawed spring traps for capturing animals and more specifically is directed to a device for use with such traps that are adapted for cushioning the gripping force of the trap jaws.

2. Description of the Prior Art

Basic steel jawed spring traps have been known in the art for over 100 years. Such traps consist of two jaws that are spring biased toward one another to form a gripping mechanism when a trigger element is actuated.

Early forms of spring traps included jaws members having serrated edge portions for engaging the limbs of animals trapped therein. However, for humane purposes, such traps are no longer in use. Instead, for many years now the jaws of spring traps have been formed in the shapes of bars with smooth edges surfaces that abut against one another in a gripping action. Although spring traps with smooth jaw portions are less prone to cause serious injury to an animal trapped therein, it is still not unusual for such traps to break the bone or skin surface of a limb trapped therein or to cut off the circulation of blood in the limb causing permanent damage thereto.

Many spring traps currently being manufactured include indented portions in the jaws to provide a gap between the jaw gripping portions for the purpose of reducing the risk of serious injury to an animal trapped. Nevertheless, the likelihood of serious injury to an animal when it is trapped still exists with most present day trap designs. Accordingly, numerous states have enacted legislation prohibiting the use of spring traps unless they include some means to significantly reduce the risk of injury to animals trapped therein. One known trap modification that is currently being used to comply with such legislation is the use of straight rubber strips on the opposing jaw edges of a trap to provide a cushioning effect. This modification is helpful in decreasing the risk of injury from skin or bone breakage, but still suffers from the defect of blocking blood circulation.

The present invention provides a device adapted to be used on a spring trap to cushion and distribute the force of the gripping mechanism of the trap to significantly decrease the risk of all types of injuries to animals.

SUMMARY OF THE INVENTION

The present invention provides a device attachable to at least one of two co-acting jaws of a spring trap utilized for capturing animals. The device includes at least one cushion assembly that is formed of an elongated carrier frame attachable to one jaw of the trap, and spaced apart cushion members secured to the carrier frame to project outwardly therefrom in a parallel alignment to one another.

The cushioned members are composed of a deformable material and the frame is attached to the jaw in such fashion that during a trapping operation the cushion members engage a limb of an animal being trapped to cushion and distribute the force of the jaws on the limb to reduce injury to the animal. The cushion members are also aligned with respect to the jaw so as to be substantially parallel to the longitudinal axis of the animal's limb to thereby avoid blocking circulation of blood in such limb.

The carrier frame preferably includes an elongated body portion for receiving a portion of one of the jaws and a lid portion that is movable with respect to the body portion to open or close the body portion. Also, attachments means are associated with the lid and body portions to semi-permanently secure the lid in a closed position with respect to the body portion to secure the carrier frame on the jaw. The body portion is U-shaped in cross section with a sidewall on which the cushion members are secured and top and bottom walls. The attachment means preferably include an elongated platform secured to an inner surface of the body portion in surface to surface contact therewith, and connecting means for semi-permanently attaching said lid to said platform.

To provide optimum operation of the present invention, the cushion members should extend across at least the entire width of the sidewall of the carrier frame body portion to increase the amount of surface area by which the trapping force of the jaws can be distributed. Furthermore, to enhance the gripping action of the jaws without producing or increasing the risk of damage to an animal, the cushion members should include spaced apart limb engaging nodes.

Typically, a device of the present invention will include a cushion assembly for each jaw of the trap for maximizing the cushioning and distribution of trapping force provided thereby. Furthermore, the cushion assemblies are preferably attached to the jaws in such fashion that the cushion members of said assemblies are offset with respect to one another so that line of force of any one cushion member is not the same as that of any other cushion member.

BRIEF DESCRIPTION OF THE DRAWINGS

FIG. 1 is a top-side perspective view of a preferred embodiment of a cushion assembly of the present invention;

FIG. 2 is an end view in elevation of the cushion assembly of FIG. 1;

FIG. 3 is a bottom view of the cushion assembly of FIG. 1;

FIG. 4 is a top view of a typical spring trap showing a cushion assembly of the present invention secured on each jaw of the trap, which is in an open condition;

FIG. 5 is a segmented view of two cushion assemblies of the present invention shown in an abutting relationship; and FIG. 6 is a top view of a modified embodiment of the cushion assembly of FIG. 1.

DETAILED DESCRIPTION OF THE PRESENT INVENTION

The present invention provides a device attachable to at least one of two co-acting steel jaws of a spring trap for capturing animals. With reference to FIG. 1, a preferred embodiment of the device of the present invention includes at least a first cushion assembly 10 that is formed of an elongated carrier frame 11 and spaced apart cushion members 12. Preferably, the frame 11 and cushion members 12 are formed from deformable materials such as a high strength plastic or hard rubber.

As indicated in FIG. 1, the carrier frame 11 has a body portion 15 formed in a U-shaped configuration and a lid 16 that is preferably hinge-connected to a top wall 17 of the body portion 15. Also forming the body portion 15 is a side wall 18 to which the cushion members 12 are attached by gluing or other such attachment means to protect outwardly therefrom in a parallel alignment with one another and a bottom wall 19.

An elongated platform 24 that is preferably formed of plastic or other similar material is attached to the inner surface of the bottom wall 19 in a surface to surface relationship to serve two purposes. Firstly, the platform 24 preferably forms part of an attachment means for semi-permanently attaching the lid 16 to the body portion 15 in a closed position. It does so by co-acting with connecting means, such as self-tapping screws that can be inserted through holes 26 in the lid 16 and screwed into the platform 24. It should be noted that the lid 16 is not essential to the present invention because the assembly 10 may be mounted on a trap jaw by securing the top and bottom walls 17 and 19 respectively to the jaw by screws or other such attachment means.

The second function of the platform 24 is to partially fill the U-shaped channel formed by the body portion 15 so that the cushion assembly 10 will fit tightly about the jaw of a spring trap. Although the platform 24 is shown as a separate piece apart from the bottom wall 19, the platform 24 can be integrally molded with such wall.

As shown best in FIGS. 1 and 3, the cushion members 12 are cylindrically shaped and due to their shape and composition are deformable. Preferably, the cushion members include two nodes 30 on the outermost circumference of the cushion members 12 for a purpose to be described below.

Referring now to FIG. 4, a standard steel jawed spring trap is shown at 35. The trap 35 includes a pair of co-acting jaw members 36 that are spring biased toward one another by coil springs 37. The jaw members 36 are commonly referred to in the art as "offset jaw members" in that they each contain recessed or indented portions 38 so that when the jaw members 36 abut against one another, the recessed portions 38 define a gap to decrease the likelihood of injury to an animal caught in the trap 35.

Secured to each of the jaw members 36 is a cushion assembly 10 of the present invention which are each located in the indented portions 38 of the jaw members 36. However, it is not essential that the cushion assemblies 10 of the present invention be utilized with only traps having offset jaw members. Instead, the cushion assemblies 10 can be utilized with other types of jaw members as well.

As illustrated by FIG. 5, it is preferable when the jaw assemblies 10 are mounted on a trap, that they be positioned with respect to one another in a longitudinally offset relationship so that the cushion members 12 of one jaw assembly 10 will be interposed between the cushion members 12 of the other cushion assembly. In this way, the cushion members 12 will not exert a line of force on the limb of an animal caught in the trap 35 that is the same as that exerted by any other cushion members 12 to decrease the force exerted on a particular portion of the animal's limb. It is also preferable for the cushion members 12 to have the pair of nodes 30 longitudinally aligned with respect to one another to increase the gripping force of the members 12.

Although the cushion members 12 have been described as being cylindrical, such configuration is not considered essential to the present invention and other variations of cushion members may be used. For example, as depicted in FIG. 6, cushion members 42 of a semi-circular configuration are shown attached to the carrier frame 11 to form a modified embodiment of the device of the present invention. However, for the present invention to provide optimum advantage, the cushion members 12 or 42 must be oriented perpendicular to the longitudinal axis of the carrier frame 11. In such alignment, when an animal has one of its limbs gripped by the trap 35, the cushion members 12 or 42 will be substantially parallel to the longitudinal axis of the limb so as to be less likely to block the circulation of blood therein.

There has thus been described a preferred and a modified form of the present invention that provide an improved device for use with a spring trap to reduce the potential of injuries to animals. Although a specific embodiment has been disclosed herein, it should be understood by those skilled in the art that modifications of various types may be made to the embodiment disclosed without departing from the true spirit and scope of the present invention.

I claim:

1. A device attachable to at least one of two co-acting jaws of a spring trap for capturing an animal, said device has at least a first cushion assembly comprising:

(a) an elongated carrier frame attachable to one jaw of said trap;
   wherein said carrier frame comprises:
   an elongated U-shaped body portion for receiving a portion of said one jaw and having a side wall on which said cushion members are secured and top and bottom walls;
   a lid portion hinged to one of the top and bottom walls of said body portion and movable with respect to said body portion to open or close said body portion; and
   attachment means associated with said lid and body portions to semi-permanently attach said lid in a closed position with respect to said body portion to secure said carrier frame on said one jaw (b) spaced apart cushion members secured to said frame to project outwardly therefrom in a parallel alignment to one another, said cushion members composed of a deformable material; and (c) said frame is attached to said one jaw so that during a trapping operation, said cushion members engage a limb of the animal being trapped to cushion and distribute the trapping force of the jaws on said limb to reduce injury to the animal.

2. A device as recited in claim 1 wherein said cushion members have a cross section with a curved configuration.

3. A device as recited in claim 1 wherein said cushion members are aligned with respect to said one jaw so as to be substantially parallel to the longitudinal axis of the limb of said animal and thereby avoid blocking the circulation of blood in said limb.

4. A device as recited in claim 1 wherein said attachment means includes:

(a) an elongated platform secured to an inner surface of the other of the top and bottom walls of said body portion in surface-to-surface contact therewith; and (b) connecting means for semi-permanently attaching said lid to said platform.

5. A device as recited in claim 4 wherein said cushion members extend across at least the entire width of said side wall and include spaced apart limb engaging nodes protruding outwardly from said members to enhance the gripping action of said trap.

6. A device as recited in claim 5 wherein said device has a second cushion assembly that is similar in construction to said first cushion assembly and is attached to the other jaw of said trap so that the cushion members of said assemblies will form the gripping means of said trap.

7. A device as recited in claim 6 wherein said second cushion assembly is attached to the other jaw of said trap in such fashion that the cushion members of said second assembly are offset with respect to those of the first assembly so the line of force of any one cushion member is not the same as that of any other cushion member.

* * * * *